United States Patent
Vanstone

(10) Patent No.: US 8,520,847 B2
(45) Date of Patent: *Aug. 27, 2013

(54) SPLIT-KEY KEY-AGREEMENT PROTOCOL

(75) Inventor: Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,467

(22) Filed: Apr. 19, 2012

(65) Prior Publication Data

US 2012/0257745 A1    Oct. 11, 2012

Related U.S. Application Data

(63) Continuation of application No. 12/950,626, filed on Nov. 19, 2010, now Pat. No. 8,170,207, which is a continuation of application No. 11/855,608, filed on Sep. 14, 2007, now Pat. No. 7,840,004, which is a continuation of application No. 11/155,899, filed on Jun. 20, 2005, now Pat. No. 7,272,226, which is a continuation of application No. 09/619,633, filed on Jul. 19, 2000, now Pat. No. 6,934,392.

(30) Foreign Application Priority Data

Jul. 19, 1999   (CA) ..................................... 2277633

(51) Int. Cl.
  *H04L 9/00* (2006.01)
(52) U.S. Cl.
  USPC .............. 380/44; 380/278; 380/285; 713/171
(58) Field of Classification Search
  None
  See application file for complete search history.

(56) References Cited

U.S. PATENT DOCUMENTS

| | | | |
|---|---|---|---|
| 5,491,750 | A | 2/1996 | Bellare et al. |
| 6,256,733 | B1 | 7/2001 | Thakkar et al. |
| 6,530,020 | B1 | 3/2003 | Aoki |
| 6,584,566 | B1 | 6/2003 | Hardjono |
| 6,934,392 | B1 | 8/2005 | Vanstone |
| 7,328,282 | B2 | 2/2008 | Ganesan et al. |
| 2001/0016908 | A1 | 8/2001 | Blake-Wilson et al. |

(Continued)

FOREIGN PATENT DOCUMENTS

| | | |
|---|---|---|
| CA | 2241705 C | 9/1998 |
| CA | 2277633 A1 | 7/1999 |

(Continued)

OTHER PUBLICATIONS

Menezes, Alfred J. et al.; Handbook of Applied Cryptography; 1997; pp. 385 to 424, 570 to 577; CRC Press.

(Continued)

*Primary Examiner* — Minh Dinh
(74) *Attorney, Agent, or Firm* — John R. S. Orange; Blake, Cassels & Graydon LLP

(57) ABSTRACT

There is provided a method of one member of a first entity generating an intra-entity public key. The first entity has a plurality of members and the one member has a long-term private key and a corresponding long-term public key. The method includes generating a short-term private key and a corresponding short-term public key, computing an intra-entity shared key by mathematically combining the short-term public key of the one member and respective short-term public keys of each other member of the first entity and computing the intra-entity public key by mathematically combining the short-term private key, the long-term private key and the intra-entity shared key.

16 Claims, 2 Drawing Sheets

(56) References Cited

U.S. PATENT DOCUMENTS

| 2003/0026433 | A1 | 2/2003 | Matt |
| 2003/0123668 | A1 | 7/2003 | Lambert et al. |
| 2004/0073795 | A1 | 4/2004 | Jablon |
| 2005/0232428 | A1 | 10/2005 | Little et al. |

FOREIGN PATENT DOCUMENTS

| EP | 0661844 | A2 | 7/1995 |
| EP | 0739106 | B1 | 10/2003 |
| WO | WO 98/18234 | A1 | 4/1998 |
| WO | WO 00/01109 | A1 | 1/2000 |
| WO | WO 01/06697 | A2 | 1/2001 |
| WO | WO 02/084975 | A2 | 10/2002 |

OTHER PUBLICATIONS

Steiner M. et al.; "CLIQUES: A New Approach to Group Key Agreement"; May 1998; IEEE.

Boyd. C. et al.; "Design and Analysis of key Exchange Protocols via Secure Channel Identification"; Nov. 28, 1994; University of Manchester.

Van Oorschot; Paul C.; "Authentication and Authenticated key Exchanges"; Mar. 6, 1992; Kluwer Academic Publishers; Netherlands.

Ateniese, G. et al.; "New Multiparty Authentication Services and Key Agreement Protocols"; IEEE Journal on Selected Areas in Communication; Apr. 2000; pp. 628 to 639; vol. 18, No. 4.

Langford, Susan K.; "Weaknesses in Some Threshold Cryptosystems"; Proceedings of the Annual International Cryptology Conference, Berlin, Germany; Aug. 18, 1996; pp. 74 to 82; vol. CONF. 16; Springer.

Zhang, M.; "Analysis of the SPEKE Password-Authenticated Key Exchange Protocol"; IEEE Communications Letters; Jan. 2004; pp. 63 to 65; vol. 8, No. 1.

Jablon, D.P.; "Strong Password-Only Authenticated Key Exchange"; Computer Communication Review; ACM SIGCOMM; Oct. 1996; pp. 5 to 26; vol. 26. No. 5; New York.

Blackburn, S. et al.; "Shared Generation of Shared RSA Keys"; 1998; Retrieved from the Internet on May 23, 2006: http://citeseer.ifi.unizh.ch/blackburn98shared.html.

Boneh, D. et al.; "Efficient Generation of Shared RSA Keys"; 1997; Retrieved from the Internet on May 23, 2006; http://citeseer.ist.psu.edu/boneh97efficient.html.

Hardjono, T. et al.; "Secure and Scalable Inter-Domain Group Key Management for N-to-N Multicast"; 1998; Retrieved from the Internet on May 23, 2006; http://ieeexplore.ieee.org/iel4/5962/15952/00741118.pdf?tp&arnumber=741118&isnumber=15952.

Apostolescu, Radu; Supplementary search report from European Application No. 05729970.3; search completed May 11, 2007.

US 8,520,847 B2

SPLIT-KEY KEY-AGREEMENT PROTOCOL

CROSS REFERENCE TO RELATED APPLICATIONS

This is a continuation of U.S. patent application Ser. No. 12/950,626 filed on Nov. 19, 2010, which is a continuation of U.S. patent application Ser. No. 11/855,608 filed on Sep. 14, 2007, now issued as U.S. Pat. No. 7,840,004, which is a continuation of U.S. patent application Ser. No. 11/155,899 filed on Jun. 20, 2005, now issued as U.S. Pat. No. 7,272,226, which is a continuation of U.S. patent application Ser. No. 09/619,633 filed on Jul. 19, 2000, now issued as U.S. Pat. No. 6,934,392, which claims priority from Canadian Patent Application No. 2,277,633 filed on Jul. 19, 1999 the contents of all of the above-noted applications being incorporated herein by reference.

FIELD OF THE INVENTION

The present invention relates to the field of key agreement protocols in cryptographic systems.

BACKGROUND OF THE INVENTION

Traditionally, entities communicated on paper and were able to ensure privacy in many ways. The transition from paper to electronic media however, has created the need for electronic privacy and authenticity. In cryptographic schemes, the entities use primitives, which are mathematical operations together with encoding and formatting techniques to provide security. For each scheme the parties participating in the scheme normally agree upon or exchange certain information before executing the scheme function. The specific information that needs to be agreed upon is detailed for each scheme. Such agreement may be achieved by any means suitable for the application. It may be implicitly built into the system or explicitly achieved by some sort of exchange of information with or without involvement from other parties. In particular, parties often need to agree on parameters and obtain each other's public keys. For proper security, a party needs to be assured of the true owners of the keys and parameters and of their validity. Generation of parameters and keys needs to be performed properly and, in some cases, verification needs to be performed.

In general, the different types of schemes may be defined as follows. Key agreement schemes, in which two parties use their public, private key pairs and possibly other information, to agree on a shared secret key. A signature scheme with appendix is a scheme in which one party signs a message using its private key and any other party can verify the signature by examining the message, the signature, and the signer's cross corresponding public key. In signature schemes with message recovery, one party signs a message using its private key and any other party can verify the signature and recover the message by examining the signature and the signer's corresponding public key. Finally, in encryption schemes, any party can encrypt a message using the recipient's public key and only the recipient can decrypt the message using its corresponding private key.

An example of a key derivation scheme is the MQV (Menezes-Qu-Vanstone). In the MQV scheme, a shared secret value is derived from one party's two key pairs and another party's two public keys where all the keys have the same discrete log (DL) parameters. In this generalized MQV scheme, it is assumed that the shared secret value is that which is shared between two parties.

However, where each party or entity consists of a collection of parties say $A = \{A_1, A_2 \ldots A_n\}$ and $B = \{B_1, B_2, \ldots B_m\}$ where m is not necessarily equal to n and at least one of m or n is at least two (that is, not both A and B consist of one individual), it is difficult to implement the generalized MQV scheme if these two entities wish to establish a common key in order to communicate privately.

SUMMARY OF THE INVENTION

In one aspect, there is provided a system for generating a shared secret value between entities (A, B) in a data communication system, the system comprising at least one of the entities having a plurality of members ($A_i$, $B_i$), each member having a long term private key and a corresponding long term public key, the system being configured for: (a) generating an entity long term public key for each entity by combining the long term public keys of each members of the entity; (b) generating a short term private and a corresponding short term public key for each of the members; (c) making the short term public keys available to members within an entity; (d) each member: i) computing an intra-entity shared key by mathematically combining the short term public keys of each the member; ii) computing an intra-entity public key by mathematically combining its short-term private key, the long term private key and the intra-entity shared key; (e) for each entity combining intra-entity public keys to derive a group short-term public key; (f) each entity making its intra-entity shared key and its entity long term public key available to the other entities; and (g) each entity computing a common shared key K by combining its group short term public key, with the intra-entity shared key, and an entity long term public key received from the other entity.

In another aspect there is provided a processor for performing cryptographic operations that is configured to operate similar to that of the system described above.

In yet another aspect, there is provided a first entity in a data communication system having a plurality of members for participation in the data communication system, each the plurality of members having a long term private key and a corresponding long term public key, the first entity being configured for generating a group short term public key for use in establishing a shared secret value with a second entity in the data communication system by: a) generating a short term private key and a corresponding short term public key for each of the plurality of members; b) exchanging short term public keys of the plurality of members within the one entity; c) for each of the plurality of members: i) computing an intra-entity shared key by mathematically combining the short term public keys of each of the plurality of members; and ii) computing a respective intra-entity public key by mathematically combining its short term private key, its long term private key and the intra-entity shared key; and d) combining the intra-entity public keys of the plurality of members to derive the group short term public key.

In yet another aspect there is provided a processor for performing cryptographic operations that is configured to operate similar to that of the first entity described above.

BRIEF DESCRIPTION OF THE DRAWINGS

A preferred embodiment of the invention will now be described by way of example only with reference to the accompany drawings in which.

DETAILED DESCRIPTION OF THE PREFERRED EMBODIMENTS

Figure 1:
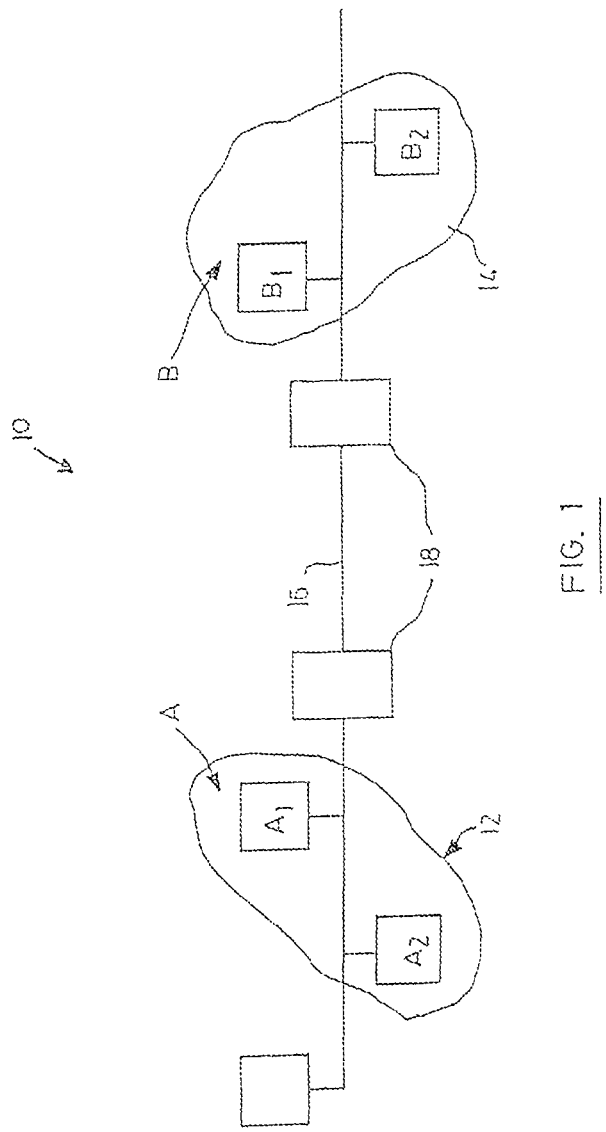
FIG. 1 is a schematic diagram of a communication system.

Referring to FIG. 1, a schematic diagram of a communication system is shown generally by numeral 10. The system 10 includes a first entity A (12) and a second entity B (14) that exchange data over a communication channel 16. Each of the entities A and B include members $A_1, A_2 \ldots A_n$, and $B_1, B_2 \ldots B_m$, respectively. For convenience, the embodiment described has two members $A_1, A_2$ and $B_1, B_2$ although it will be appreciated that typically each entity will have several members. It is assumed the entities A and B include processors for performing cryptographic operations and the like. The members $A_1, A_2$ may for example be a first group of users on a local area network (LAN) that wish to communicate securely with a second group of users $B_1, B_2$ on a second LAN or even on the same LAN. In either case the computations may be performed for the entities A (12) and B (14) by for example a LAN server 18 or the like, provided that each member has its own secure boundary.

Each entity and its associated members $A_i, B_i$ have been initialized with the same system parameters. The system parameters for this exemplary protocol are an elliptic curve point P, which is the generating point of an elliptic curve over $F_2^m$ of order n. Additionally, each of the members is initialized with respective long-term public and private key pairs. That is, each of the members $A_i$ has long term private and public key pairs $(a_i, a_iP)$ and each of the member $B_i$ have long term private and public key pairs $(b_i, b_iP)$, respectively.

Each of the entities A, B generates respective long-term public keys derived from the long-term public keys of each of its members. The long-term private key a of the entity A is then $(a_1+a_2+\ldots a_n)$ and its corresponding long-term public key, aP, is $(a_1+a_2+\ldots a_n)$P. In the present example the key pair (a, aP) of entity A is $(a_1+a_2)$; $(a_1+a_2)$ P. Similarly, for entity B its long-term private key b is $(b_1+b_2)$ and its corresponding long-term public key is bP $(b_1+b_2)$ P. The entity long-term public keys aP, bP can be computed by summing the members public keys. The entity public keys are published by the respective entities, and if appropriate certified by a trusted authority or CA trusted by all of the entities.

Typically, entities A (12) and B (14) wish to agree upon a common key, which may then be used for subsequent cryptographic communications between the activities.

Figure 2:
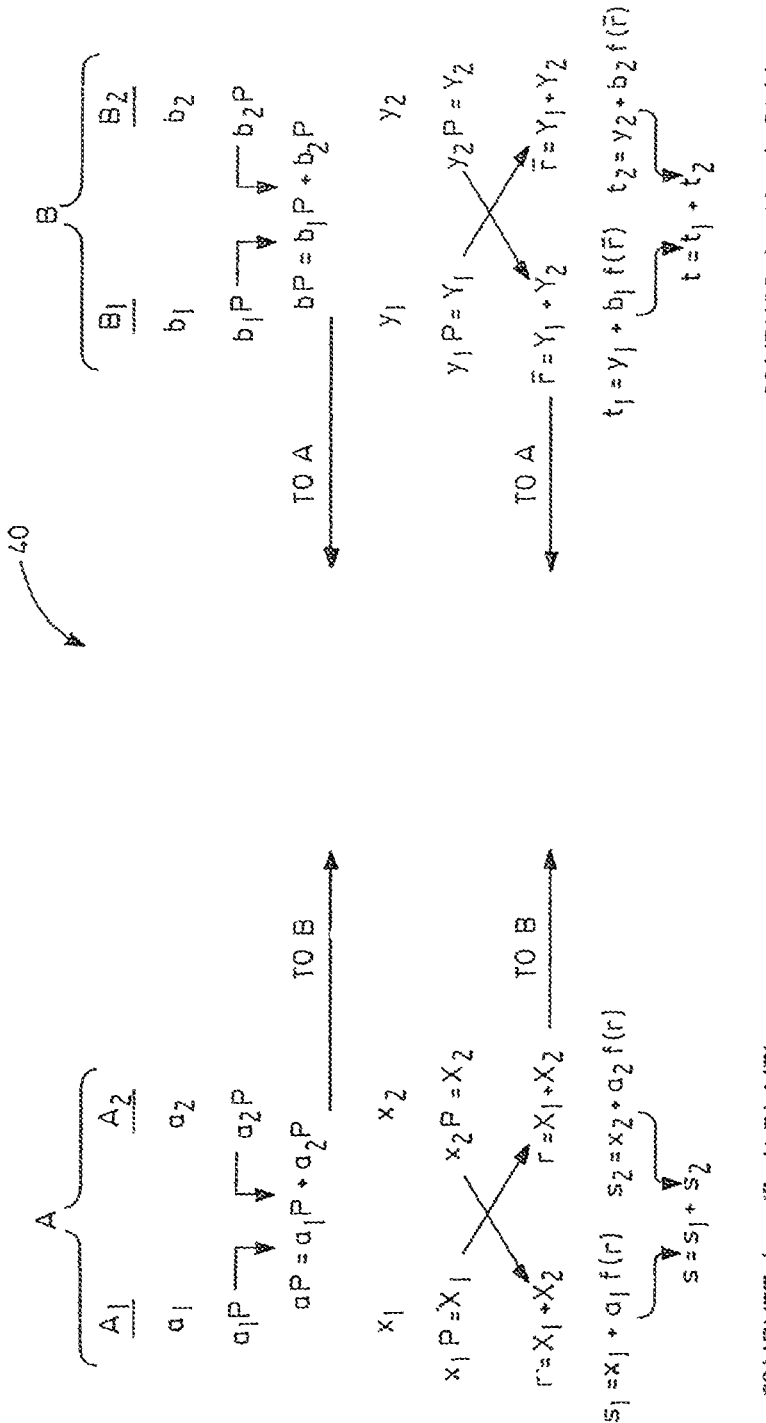
FIG. 2 is a schematic diagram illustrating the steps of a protocol to establish a common key.

Referring thus to FIG. 2, a schematic diagram of an embodiment of a suitable protocol is shown generally by numeral 40. The member $A_1$ generates a random value $x_1$ (its short-term private key, also known as ephemeral or session key) and computes a corresponding value $x_1P$ (its short-term public key); similarly, member $A_2$ generates a random value $x_2$ and computes a corresponding value $x_2P$. Preferably $0<a_i<n-1$ and $0<x_i<n-1$. Next, the members of the entity A exchange their session public keys $x_iP$. In the present example, $A_2$ and $A_1$ exchange their session public keys $x_1P$ and $x_2P$ denoted $X_1$ and $X_2$ respectively. This may be termed a first intra-entity key exchange.

Next, member $A_1$ computes $r=x_1P+x_2P$ and similarly, member $A_2$ computes $r=x_2P+X_1P$. Thus, establishes an intra-entity shared key available and containing a contribution from each member of the entity.

The entity A transmits the intra-entity shared key r to the entity B with whom it wishes to establish a common key K.

Next, member $A_1$ computes a short term intra-entity public key $s_1$ using its short term private key and long term private key combined with a function f of the intra-entity public key, that is $s_1=x_1+a_1f(r)$ (mod n), where f is typically a hash function such as SHA-1 and n is the order of the curve. Similarly, member $A_2$ computes its intra-entity public key $s_2=x_2+a_2f(r)$ (mod n.).

The entity A computes an entity or group short term public key, which is derived from a summation of the intra-entity public key of each member $s=s_1+s_2=x_1+x_2+(a_1+a_2)f(r)$ mod (n).

The entity B similarly computes the analogous information using its own public and private keys using the same computations performed by entity A. Thus, each member of B computes a intra-entity shared key $\bar{r}$ using the short term public keys of each of the members and $\bar{r}$ is forwarded to entity A. Next, each of the members in B compute their own intra-entity public key $t_1=y_1+b_1f(\bar{r})$ mod(n) and computes the group short-term public key $t=t_1+t_2$.

The entity A then computes a value K which is the shared key between the entities A and B by retrieving the long term public key, bP, of entity B and computing $K=s(\bar{r}+(bP)f(\bar{r}))=s(t)P$. The entity B also retrieves the long term public key aP of entity A and computes K using t, r, and aP, i.e. $K=t(r+aP, f(r))=t(s)P$.

Consequently, if a member of the entity A, either $A_1$ or $A_2$, is not present in the scheme then the group short term public key, s, changes, as does the value for K. Therefore, communication with entity B would not be successful without establishing a new session. Similarly, if either $B_1$ or $B_2$ is not present in the scheme then the group short term public key, t, changes, altering the value of K. In this case, communication with A would not be successful without establishing a new session.

Accordingly, the present protocol ensures that all members of each entity must participate in the scheme and no sub-collection of either entity can impersonate its entire entity.

Although the above scheme has been described with respect to the elliptic curve systems which is an additive group, it may analogously be used in multiplicative groups. Furthermore the above protocol although exemplified with two members per entity, may be generalized where each party or entity consists of a collection of members say $A=\{A_1, A_2 \ldots A_n\}$ and $B=\{B_1, B_2, \ldots B_m\}$, where m is not necessarily equal to n and at least one of m or n is at least two (that is, not both A and B consist of one individual).

Although the invention has been described with reference to certain specific embodiments, various modifications thereof will be apparent to those skilled in the art without departing from the spirit and scope of the invention as outlined in the claims appended hereto.

The invention claimed is:

1. A method of one member of a first entity generating an intra-entity public key, said first entity having a plurality of members and one or more electronic processors for performing cryptographic operations, said one member having a long-term private key and a corresponding long-term public key, said method comprising:

generating, by at least one of said one or more electronic processors, a short-term private key and a corresponding short-term public key;

computing, by at least one of said one or more electronic processors, an intra-entity shared key by mathematically combining said short-term public key of said one member and respective short-term public keys of each other member of said first entity;

computing, by at least one of said one or more electronic processors, said intra-entity public key by mathematically combining said short-term private key, said long-term private key and said intra-entity shared key, said intra-entity public key for combining with respective intra-entity public keys of said each other member of said first entity to derive a group public key.

2. The method of claim 1, wherein said long-term public key is derived from a generator point P and said long-term private key.

3. The method of claim 2, wherein said short-term public key of said one member is obtained by said one member selecting a random integer $x_i$ and multiplying said point P by said random integer to obtain a value $x_iP$ for use as said short-term public key.

4. The method of claim 1, wherein said intra-entity shared key is computed by said one member summing said short-term public key of said one member and respective short-term public keys of said each other member of said first entity.

5. The method of claim 4, wherein said intra-entity public key $s_i$, is derived by said one member computing $s_i=x_i+a_i f(\Sigma x_i P)$, where $a_i$ represents said long-term private key and $f$ is a hash function.

6. An electronic processor for performing cryptographic operations for one member of a first entity in a data communication system, said one member having a long-term private key and a corresponding long-term public key, said electronic processor generating an intra-entity public key of said one member, said electronic processor configured for:
   generating a short-term private key and a corresponding short-term public key;
   computing an intra-entity shared key by mathematically combining said short-term public key of said one member and respective short-term public keys of each other member of said first entity;
   computing said intra-entity public key by mathematically combining said short-term private key, said long-term private key and said intra-entity shared key, said intra-entity public key for combining with respective intra-entity public keys of said each other member of said first entity to derive a group public key.

7. The electronic processor according to claim 6, wherein said long-term public key is derived from a generator point P and said long-term private key.

8. The electronic processor according to claim 7, wherein said generating comprises selecting a random integer $x_i$ and multiplying said point P by a to obtain $x_iP$ for use as said short-term public key.

9. The electronic processor according to claim 6, wherein said intra-entity shared key is computed by summing said short-term public key of said one member and respective short-term public keys of said each other member of said first entity.

10. The electronic processor according to claim 9, wherein said intra-entity public key $s_i$, is derived by computing $s_i=x_i+a_i f(\Sigma x_i P)$, where $a_i$ represents said long-term private key and $f$ is a hash function.

11. A non-transitory storage medium having instructions stored thereon for performing cryptographic operations in a cryptographic processor for one member of a first entity to generate an intra-entity public key, said one member having a long-term private key and a corresponding long-term public key, said cryptographic operations comprising:
   generating a short-term private key and a corresponding short-term public key;
   computing an intra-entity shared key by mathematically combining said short-term public key of said one member and respective short-term public keys of each other member of said first entity;
   computing said intra-entity public key by mathematically combining said short-term private key, said long-term private key and said intra-entity shared key, said intra-entity public key for combining with respective intra-entity public keys of said each other member of said first entity to derive a group public key.

12. The non-transitory storage medium according to claim 11, wherein said long-term public key is derived from a generator point P and said long-term private key.

13. The non-transitory storage medium according to claim 12, wherein said generating instruction comprises selecting a random integer $x_i$ and multiplying said point P by a to obtain $x_iP$ for use as said short-term public key.

14. The non-transitory storage medium according to claim 11, wherein said intra-entity shared key is computed by summing said short-term public key of said one member and respective short-term public keys of said each other member of said first entity.

15. The non-transitory storage medium according to claim 14, wherein said intra-entity public key $s_i$, is derived by computing $s_i=x_i+a_i f(\Sigma x_i P)$, where $a_i$ represents said long-term private key and $f$ is a hash function.

16. The non-transitory storage medium according to claim 15, wherein said group public key is derived by computing $\Sigma s_i$.

* * * * *